United States Patent
Li et al.

(10) Patent No.: US 7,639,480 B2
(45) Date of Patent: Dec. 29, 2009

(54) FLAT PANEL DISPLAY WITH DETACHABLE BASE

(75) Inventors: Ming-Chuan Li, Miao-Li (TW); Te-Hsu Wang, Miao-Li (TW)

(73) Assignee: Innolux Display Corp., Miao-Li County (TW)

(*) Notice: Subject to any disclaimer, the term of this patent is extended or adjusted under 35 U.S.C. 154(b) by 94 days.

(21) Appl. No.: 11/985,899

(22) Filed: Nov. 19, 2007

(65) Prior Publication Data
US 2008/0117579 A1   May 22, 2008

(30) Foreign Application Priority Data
Nov. 17, 2006   (CN)   .................... 2006 2 0015834

(51) Int. Cl.
*G06F 1/16* (2006.01)

(52) U.S. Cl. .............................. 361/679.06; 248/349.1; 361/679.01

(58) Field of Classification Search ................ 361/681, 361/679.1, 679.21, 679.01, 679.02, 679.06; 248/346.01, 917, 918, 144, 181.1, 181.2–181.4, 248/349.1
See application file for complete search history.

(56) References Cited

U.S. PATENT DOCUMENTS

| | | | | |
|---|---|---|---|---|
| 2,896,901 | A * | 7/1959 | Levy et al. | 248/278.1 |
| 5,404,182 | A * | 4/1995 | Nomura | 348/836 |
| 5,404,682 | A * | 4/1995 | West | 52/165 |
| 6,027,257 | A * | 2/2000 | Richards et al. | 396/428 |
| 6,312,270 | B1 | 11/2001 | Hamon | |
| 6,619,606 | B2 * | 9/2003 | Oddsen et al. | 248/282.1 |
| 6,712,326 | B2 * | 3/2004 | Kurimoto et al. | 248/349.1 |
| 7,387,284 | B2 * | 6/2008 | Chang | 248/206.5 |

* cited by examiner

*Primary Examiner*—Michael C Zarroli
(74) *Attorney, Agent, or Firm*—Wei Te Chung

(57) ABSTRACT

A flat panel display includes a display body, a neck pivotally engaged to the display body, and a base supporting the neck. The neck includes an inner screw thread. The base includes a screw bolt threadingly coupled to the screw thread of the neck such that the neck is detachably coupled to the neck.

12 Claims, 3 Drawing Sheets

FLAT PANEL DISPLAY WITH DETACHABLE BASE

FIELD OF THE INVENTION

The present invention relates to a flat panel display (FPD) that includes a detachable base.

GENERAL BACKGROUND

Flat panel displays are commonly used as display devices for compact electronic apparatuses. Referring to FIG. 4, a typical flat panel display 4 includes a display body 40, a neck 42, and a base 44. The neck 42 is integrally formed with the base 44, and is further pivotally engaged to the display body 40 by a hinge structure (not labeled).

The integral configuration of the neck 42 and the base 44 helps the flat panel display 4 achieve good mechanical stability. However, the configuration also makes the flat panel display 4 rather bulky and inconvenient to pack or transport. It is difficult to economize on the cost of packaging and transporting the flat panel display 4.

What is needed, therefore, is a new flat panel display that can overcome the above-described deficiencies.

SUMMARY

In an exemplary embodiment, a flat panel display includes a display body, a neck pivotally engaged to the display body, and a base supporting the neck. The neck includes an inner screw thread. The base includes a screw bolt threadingly coupled to the screw thread of the neck such that the neck is detachably coupled to the neck.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
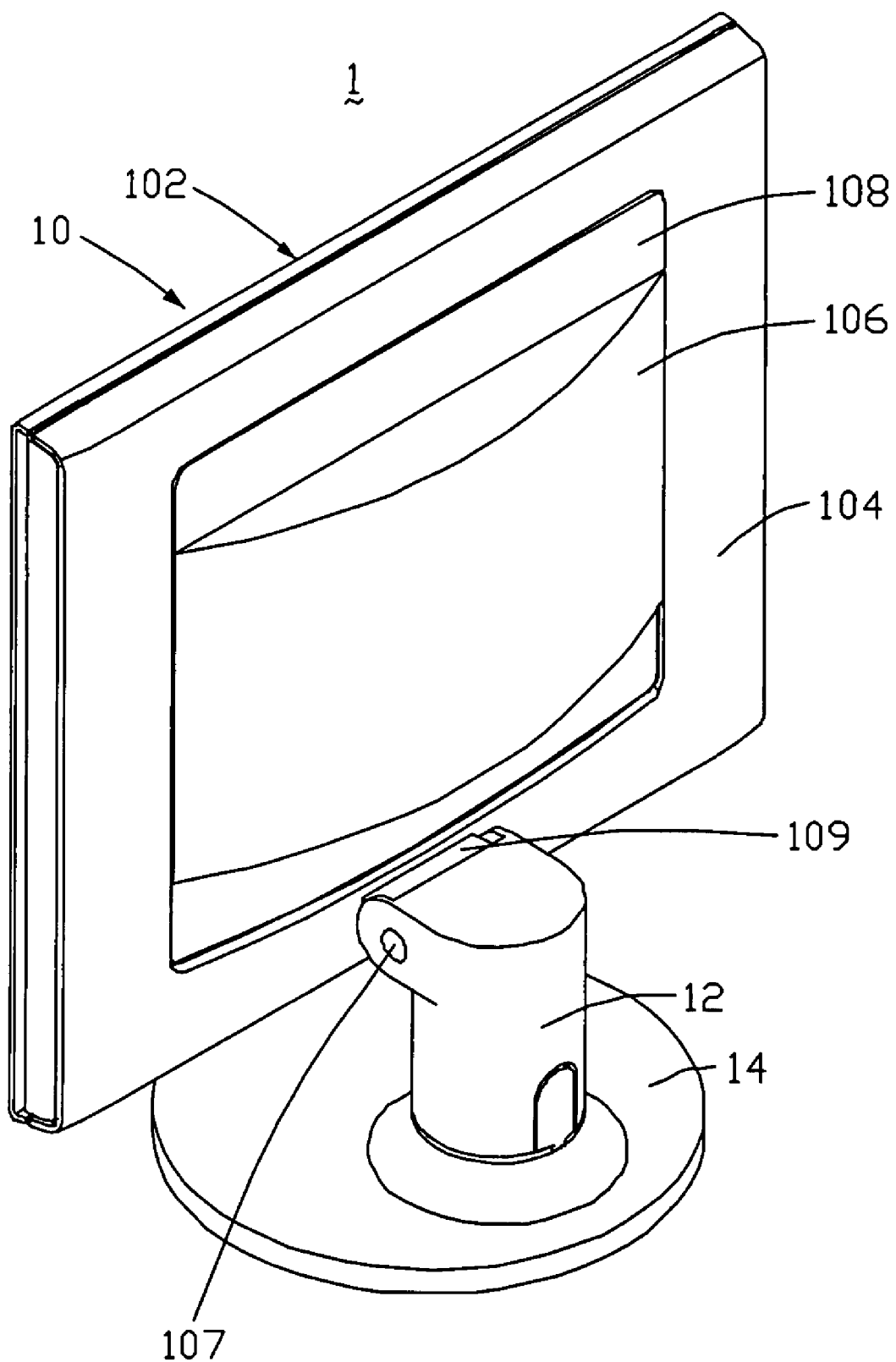
FIG. 1 is an isometric, back view of a flat panel display according to an exemplary embodiment of the present invention, the flat panel display including a display body, a neck, and a base.

Referring to FIG. 1, a flat panel display 1 according to an exemplary embodiment of the present invention is shown. The flat panel display 1 includes a display body 10, a neck 12, and a base 14. The neck 12 is pivotally engaged to the display body 10, and is further threadingly engaged to the base 14. Thereby, the display body 10 is supported by the base 14 via the neck 12.

The display body 10 has a generally rectangular shape, and includes a generally rectangular front frame 102, and a generally rectangular back cover 104 engaged with the front frame 102. The front frame 102 defines a window (not visible) for viewing a display panel (not visible) of the flat panel display 1. The back cover 104 includes an offset portion 106 outwardly extending therefrom, two recessed portions 108 respectively defined adjacent to top and bottom sides of the offset portion 106, and a hinge structure 109 pivotally interconnecting the back cover 104 and the neck 12. The hinge structure 109 is below the bottom recessed portion 108, and includes a pivot pin 107 parallel to a back side (not labeled) of the back cover 104. Typically, the front frame 102 and the back cover 104 are made from plastic or any other suitable polymer.

Figure 2:
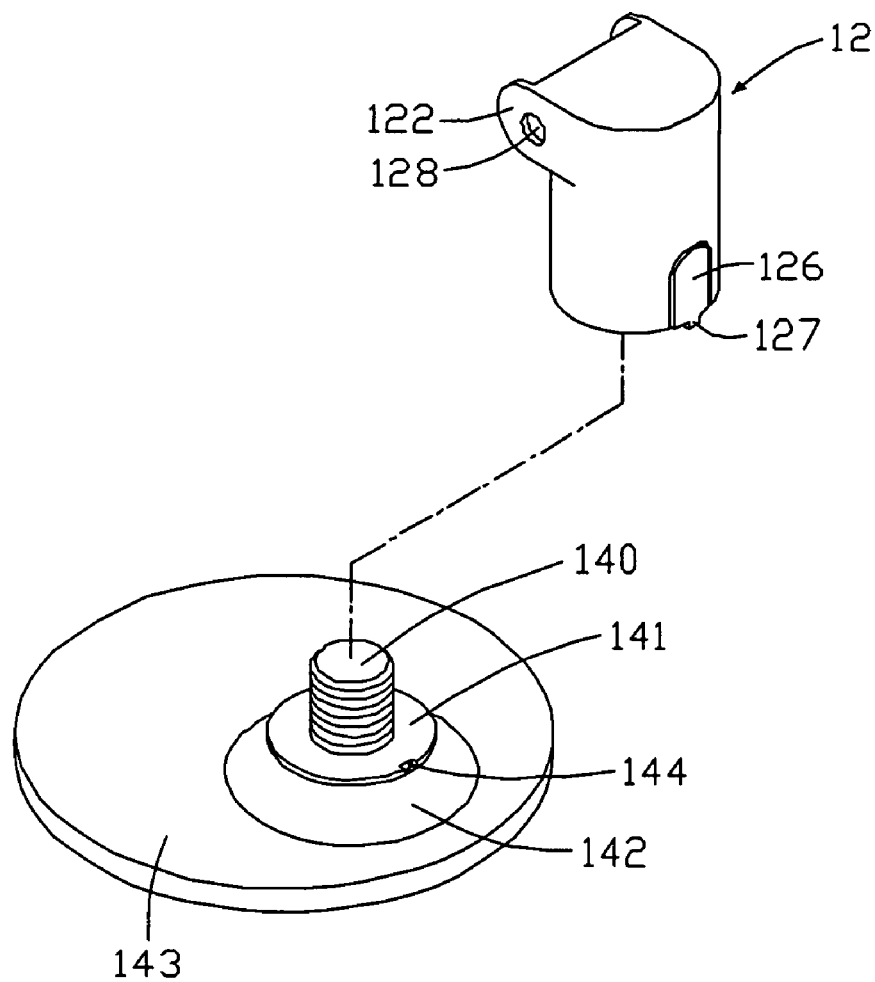
FIG. 2 is an exploded view of the neck and the base of the flat panel display of FIG. 1.

Referring also to FIG. 2, the base 14 includes a screw bolt 140, a first plate 141, a second plate 142, and a third plate 143, arranged in that order from top to bottom. The first plate 141 and the third plate 143 each have a generally cylindrical shape, and the second plate 142 has a generally frusto-conical shape, which flares out in a direction down away from the first plate 141. A diameter of the third plate 143 is much greater than a diameter of the first plate 141. A diameter of the second plate 142 increases in a direction down away from the first plate 141, but a maximum diameter of the second plate 142 (at the bottom) is still much less than the diameter of the third plate 143. The first plate 141 includes a notch 144 defined in a peripheral edge thereof. The screw bolt 140 is perpendicular to the first plate 141, the second plate 142, and the third plate 143. The screw bolt 140 includes an outer thread (not labeled). The screw bolt 140, the first plate 141, and the second plate 142 are coaxial with each other. In the illustrated embodiment, the screw bolt 140, the first plate 141, the second plate 142, and the third plate 143 are portions of a single body of material, which can be made from plastic, polymer, steel, iron, aluminum, or any other suitable metal or alloy.

Figure 3:
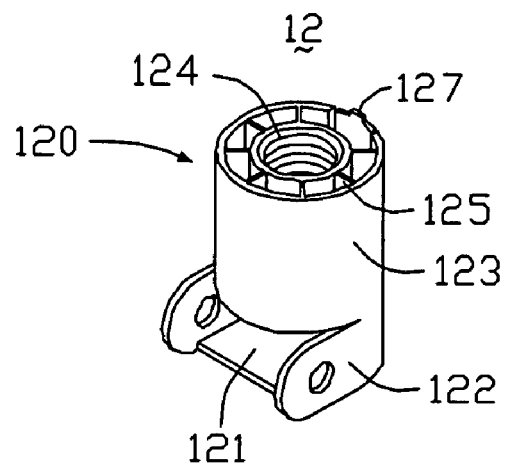
FIG. 3 is an isometric view of the neck of FIG. 2, shown inverted.
Figure 4:
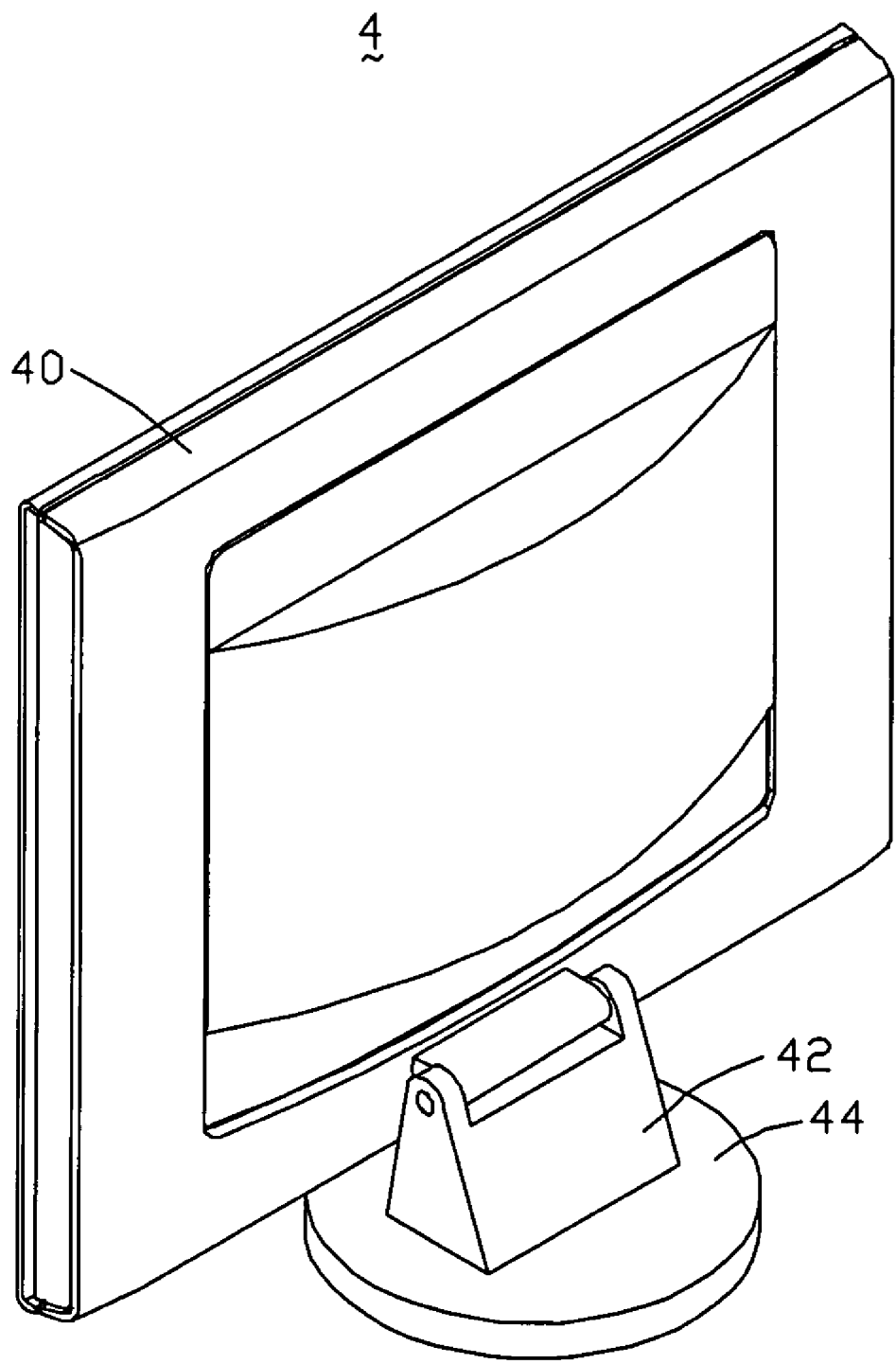
FIG. 4 is an isometric, back view of a conventional flat panel display.

Referring also to FIG. 3, the neck 12 acts as a screw cap, and includes a main body 120, an extending piece 121, and a pair of ears 122. The main body 120 has a generally cylindrical structure. The main body 120 includes a cylindrical outer portion 123, a cylindrical inner portion 124 coaxial with the outer portion 123, and a plurality of reinforcing ribs 125 interconnecting the outer portion 123 and the inner portion 124. The inner portion 124 of the main body 120 includes an inner screw thread (not labeled). The outer portion 123 of the main body 120 includes a stopping strip 126 slidably engaged to a bottom side of a peripheral wall thereof. That is, the stopping strip 126 is slidable up and down along a short path in the peripheral wall of the outer portion 123. The stopping strip 126 includes a stopping protrusion 127 extending from a bottom end thereof, the stopping protrusion 127 corresponding to the notch 144 of the first plate 141. The ears 122 integrally extend from a top portion of the main body 120. Each ear 122 defines a through hole 128 therein. The through holes 128 are coaxial with each other, and correspond to the pivot pin 107. The extending piece 121 is essentially flat, extends from the top portion of the main body 120, and interconnects the ears 122.

When the flat panel display 1 is assembled, the display body 10 is pivotally engaged to the neck 12 such that the display body 10 can be rotated back and forth through a range of angles defined in a vertical plane, and the neck 12 is threadingly engaged to the base 14. The pivot pin 107 extends through the through holes 128 of the ears 122. The screw bolt 140 is threadingly engaged to the inner portion 124 of the neck 12, and the stopping protrusion 127 of the stopping strip 126 is received in the notch 144 to stop the neck 12 and the display body 10 from being further rotated. On the other hand, when the flat panel display 1 is disassembled, the display body 10, the neck 12, and the base 14 are separate from each other.

With the above-described configuration, the flat panel display 1 can be conveniently assembled or disassembled. Therefore, the flat panel display 1 can achieved a compact size and shape for packaging or transportation. This helps to economize on the cost of packing and transporting the flat panel display 1.

Further or alternative embodiments may include the following. In one example, the first plate 141 can be threadedly engaged around the screw bolt 140. Thereby, the first plate 141 can be rotated relative to the second plate 142 and the third plate 143 around the screw bolt 140.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display comprising:
   a display body;
   a neck coupled to the display body, the neck comprising an inner screw thread and an outer portion having a central axis coaxial with a central axis of the inner screw thread, the outer portion comprising a stopping strip slidably engaged in a wall thereof; and
   a base supporting the neck, the base comprising a screw bolt threadingly coupled to the screw thread of the neck such that the neck is detachably coupled to the neck, wherein the base further comprises a first plate, a second plate, and a third plate, arranged in that order from top to bottom.

2. The flat panel display as claimed in claim 1, wherein a diameter of the second plate is greater than a diameter of the first plate, and is less than a diameter of the third plate.

3. The flat panel display as claimed in claim 1, wherein the first plate and the third plate each have a generally cylindrical shape, and the second plate has a generally frusto-conical shape.

4. The flat panel display as claimed in claim 1, wherein the screw bolt, the first plate, and the second plate are coaxial with each other.

5. The flat panel display as claimed in claim 1, wherein the screw bolt, the first plate, the second plate, and the third plate are of the same material.

6. The flat panel display as claimed in claim 1, wherein the neck further comprises two ears integrally formed at the outer portion, each ear comprising a through hole defined therein.

7. The flat panel display as claimed in claim 1, wherein the inner screw thread of the neck is part of an inner portion of the neck, and a plurality of reinforcing ribs interconnect the inner portion and the outer portion.

8. The flat panel display as claimed in claim 1, wherein the first plate comprises a notch defined in a peripheral edge thereof.

9. The flat panel display as claimed in claim 8, wherein the stopping strip comprises a stopping protrusion removably received in the notch.

10. The flat panel display as claimed in claim 6, wherein the neck is pivotally connected to the display body by a hinge structure that comprises the ears and the through holes, such that the display body can be rotated back and forth through a range of angles defined in a vertical plane.

11. The flat panel display as claimed in claim 10, wherein the hinge structure further comprises a pivot pin extending through the through holes of the ears.

12. The flat panel display as claimed in claim 10, wherein the hinge structure is arranged at a back side of the display body.

* * * * *